United States Patent
Li

(10) Patent No.: US 11,121,562 B2
(45) Date of Patent: Sep. 14, 2021

(54) SYSTEM FOR AUTOMATED CHARGING MANAGEMENT

(71) Applicant: Jeff W H Li, Irvine, CA (US)

(72) Inventor: Jeff W H Li, Irvine, CA (US)

(*) Notice: Subject to any disclaimer, the term of this patent is extended or adjusted under 35 U.S.C. 154(b) by 0 days.

(21) Appl. No.: 16/725,112

(22) Filed: Dec. 23, 2019

(65) Prior Publication Data

US 2021/0194254 A1 Jun. 24, 2021

(51) Int. Cl.
*H02J 7/00* (2006.01)

(52) U.S. Cl.
CPC .......... *H02J 7/0014* (2013.01); *H02J 7/0045* (2013.01)

(58) Field of Classification Search
CPC ...... H02J 7/0014; H02J 7/0045; H02J 7/0047; H02J 7/0021; H02J 7/027; H02J 7/1461; H02J 7/166; H02J 7/0048; H02J 7/005
See application file for complete search history.

(56) References Cited

U.S. PATENT DOCUMENTS

| | | | | |
|---|---|---|---|---|
| 7,503,338 B2 * | 3/2009 | Harrington | .......... | A01G 25/162 137/355.16 |
| 2009/0047824 A1 * | 2/2009 | Seibert | ............... | H01R 13/6683 439/490 |
| 2011/0029144 A1 * | 2/2011 | Muller | ................ | B60L 11/1818 700/293 |
| 2013/0181670 A1 * | 7/2013 | Bonwit | ................. | H02J 7/0042 320/109 |
| 2013/0207455 A1 * | 8/2013 | Doljack | ................. | H01H 35/00 307/9.1 |
| 2013/0257373 A1 * | 10/2013 | Mallon, IV | ............. | B60L 53/31 320/109 |
| 2015/0008878 A1 * | 1/2015 | Mizuno | ................... | B60L 53/16 320/109 |

FOREIGN PATENT DOCUMENTS

| | | | |
|---|---|---|---|
| CN | 202721461 U | * | 2/2013 |
| JP | H0667042 B2 | * | 8/1994 |
| KR | 20120029596 | * | 9/2010 |

* cited by examiner

*Primary Examiner* — Drew A Dunn
*Assistant Examiner* — Sailesh Thapa
(74) *Attorney, Agent, or Firm* — Feng Qian

(57) ABSTRACT

A system for managing automated charging, the automated charging management system is provided. The system comprises a charging cord management device, a charging cord connector, a power supply, a device, a first charging cord, and a second charging cord. The charging cord management device is configured to locate the power supply. The charging cord management device is configured to align the second charging cord and the charging cord connector with the power supply. The charging cord connector is configured to be in contact with the power supply without user interaction.

20 Claims, 6 Drawing Sheets

SYSTEM FOR AUTOMATED CHARGING MANAGEMENT

TECHNICAL FIELD

The present disclosure relates to a system for charging management and, in particular relates to a system for automated charging management.

BACKGROUND

Maintaining a supply of electrical current to electronic devices, especially electronic devices including a battery positioned off the floor, often requires connecting to a charging cord manually by a user. Also, the charging cord may be long, thus user experience of connecting to the charging cord to charge an electronic device positioned off the floor may need to be improved.

Therefore, it would be desirable to have a system that can automatically connect to and disconnect from the charging cord and charge to the electronic devices. It may charge the electronic devices automatically and without user interaction, at night, at a predetermined time or anytime of the day.

SUMMARY

The technical problems to be solved by this present disclosure are to provide a system for managing automated charging. The automated charging management system comprises a charging cord management device; a charging cord connector; a power supply; a device; a first charging cord; and a second charging cord.

In some embodiments, the charging cord management device is configured to locate the power supply. In some embodiments, the charging cord management device is configured to align the second charging cord and the charging cord connector with the power supply. In some embodiments, the charging cord connector is configured to be in contact with the power supply without user interaction.

In some embodiments, wherein the charging cord management device further comprises a charging cord driving device.

In some embodiments, the charging cord management device further comprises a port.

In some embodiments, the charging cord management device further comprises a charging cord support member.

In some embodiments, the charging cord management device is installed as a surface mount, or fully or partially hidden inside a building structure.

In some embodiments, the charging cord connector further comprises a motion sensor and a position sensor.

In some embodiments, the charging cord connector further comprises a wireless communication interface.

In some embodiments, the first charging cord is affixed and stored in the device, and wherein the first charging cord further comprises features of automatic retraction and dispensation.

In some embodiments, the second charging cord is stored inside the charging cord management device.

In some embodiments, the first and the second charging cord are configured to include feature of gravitational deformation.

In some embodiments, the power supply further comprises a power storage.

In some embodiments, the power supply is further configured to include feature of motion capability, positioning and data communication.

In some embodiments, each of the charging cord management device, the charging cord connector, the power supply further comprises a bus, a processing unit, a system memory, a read-only memory, a permanent storage device, an input device interface, an output device interface, and a network interface.

In some embodiments, the power supply further comprises a charging cord connector bracket to secure the connection between the charging cord connector and the power supply.

In some embodiments, the charging cord connector bracket is further configured to be operated by a spring, electromagnetic force or a motor.

In some embodiments, the port is further configured to be located at any position of the charging cord management device.

In some embodiments, the charging cord support member further comprises a motor and a wireless control module.

In some embodiments, the external charging cord driving device further comprises a guiding wheel.

In some embodiments, the external charging cord driving device further comprises a ring.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
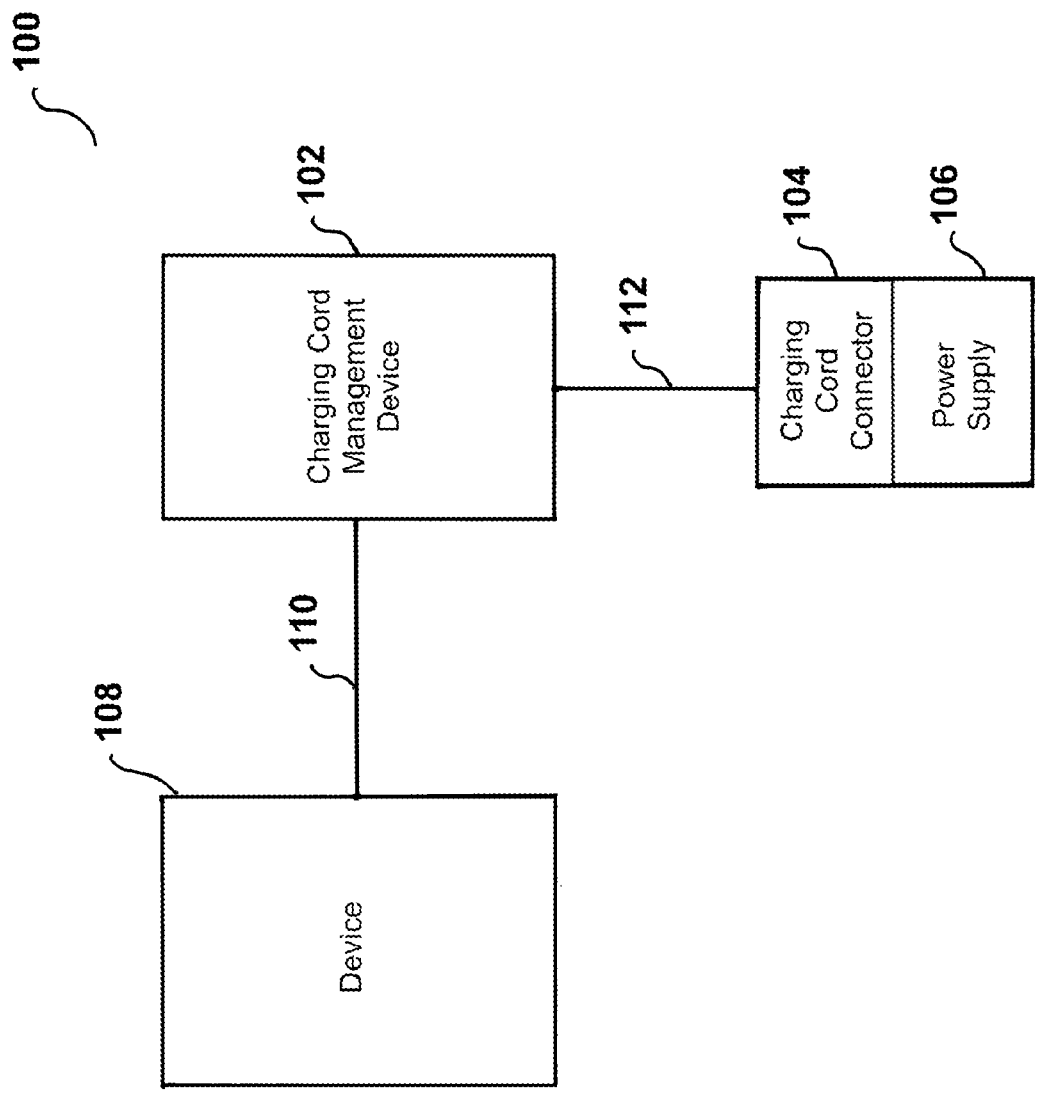
FIG. 1 is a schematic diagram of an exemplary system for providing automated charging management.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

It is to be understood that aspects of the present disclosure will be described in terms of a given illustrative architecture; however, other architectures, structures, materials and process features and steps can be varied within the scope of aspects of the present disclosure.

It will also be understood that when an element is referred to as being "on" or "over" another element, it can be directly on the other element or intervening elements can also be present. In contrast, when an element is referred to as being "directly on" or "directly over" another element, there are no intervening elements present.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for a system, which may include multiple features or combinations of features. Some or all features may or may not be present on the devices in accordance with embodiments of the present disclosure.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements and/or components, but do not preclude the presence or addition of one or more other features, integers, steps, operations, elements, components and/or groups thereof.

Spatially relative terms, such as "beneath", "below", "lower", "above", "upper", and the like, can be used herein for ease of description to describe one element's or feature's relationship to another element (s) or feature (s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present disclosure.

It is to be understood that the present embodiments are not limited to the specific devices, methods, conditions or parameters described and/or shown herein, and that the terminology used herein is for the purpose of describing particular embodiments by way of example only and is not intended to be limiting. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

In the present disclosure, it would be desirable to have a system that can automatically connect to and disconnect from the charging cord and charge to the electronic devices. One or more charging cords may be fully or partially stored in the system to automatically connect to and charge the electronic devices without user interaction, at night, at a predetermined time or anytime of the day. One or more charging cords may be fully or partially stored in the system to automatically disconnect from the electronic devices without user interaction, at night, at a predetermined time or anytime of the day, upon an indication that the electronic devices are fully charged.

FIG. 1 is a schematic diagram of an exemplary system for providing automated charging management.

As illustrated in FIG. 1, an exemplary system 100 for providing automated charging cord management comprises a charging cord management device 102, a charging cord connector 104, a power supply 106, a device 108, a first charging cord 110 and a second charging cord 112. According to one embodiment of the present disclosure, the charging cord management device 102 may be configured to store one or more charging cords and perform charging management. The charging cord management device 102 can be installed on one or more walls, ceiling, doors, windows, and/or items and parts connected to the walls, ceilings, doors, windows. The charging cord management device 102 can be installed as surface mount, as fully or partially inserted. The charging cord management device 102 may connected to the charging cord connector 104 using the second charging cord 112.

The charging cord management device 102 may include a reel, an opening and a motor to drive the reel, or other suitable cord management devices. The second charging cord 112 may be wound on the reel, and extends through the opening. Accordingly, by operation of the motor to drive the reel, a selected length of the second charging cord 112 may be selectively unwound from the charging cord management device 102, or wound on the reel and retracted into the charging cord management device 102. The charging cord management device 102, may be remote-controlled. In some embodiments, the charging cord management device 102, such as the motor, may include a communication module, so it may transmit or receive information wirelessly. In some embodiments, the charging cord management device 102, such as the motor may be wirelessly operated to selectively extend or retract the second charging cord 112, based on an indication of the electric power capacity of the device 108. In some embodiments, the charging cord management device 102, such as the motor may be wirelessly operated to selectively dispense or retract the second charging cord 112, based on an indication of proximity of power supply 106. In some embodiments, the charging cord management device 102, such as the motor may be wirelessly operated to selectively dispense or retract the second charging cord 112, based on an indication of the electric power capacity of power supply 106.

The charging cord connector 104 may be configured to connect to a power source, such as the power supply 106. The charging cord connector 104 may connect to the power supply 106 by magnetic force, electromagnetic field or gravity. The charging cord connector 104 may include one or more motion capabilities to maneuver and connect to the power supply 106. The charging cord connector 104 may be configured to positioned to be in general alignment of the power supply 106. In some embodiments, the charging cord connector 104 may include a communication module, so it may transmit or receive information wirelessly. For example, the charging cord connector 104 may include a Bluetooth module to transmit and receive position information and data. The charging cord connector 104 may be configured to move towards the power supply 106, for example, based on an indication of proximity of power supply 106. The charging cord connector 104 may be configured to transmit a signal, such as wireless signal, to the power supply 106 to move towards the charging cord connector 104. Each of the charging cord connector 104 and the power supply 106 may be configured to move towards each other to enhance the proximity of each other, based on, for example, the positions of the charging cord connector 104 and the power supply 106 transmitted wirelessly. In some embodiments, the charging cord connector 104 may transmit operation status information to the charging cord management device 102. For example, the charging cord connector 104 may be configured to inform the charging cord management device 102 that the power supply is connected to the charging cord connector 104.

The power supply 106 may include an internal power storage, such as a battery within the power supply 106. In some embodiments, the power supply 106 may be powered by an external power supply and/or be configured to transfer power from the external power source. In some embodiments, the power supply 106 may include features including one or more motion capabilities, positioning capabilities to the charging cord management device 102 and/or the charging cord connector 104.

In some embodiments, the motion capabilities may include that the power supply 106 may be configured to move. In some embodiments, the positioning capabilities may include that the power supply 106 may be configured to locate itself to a location, for example, by using one or more GPS location service. In some embodiments, the power supply 106 may be configured to locate the charging cord management device 102 and/or the charging cord connector 104, to move in proximity of the charging cord connector 104, to be contact with the charging cord connector 104 and supply power to the charging cord connector 104, based on an indication that the device 108 needs to be charged. In some embodiments, the power supply 106 may be configured to disconnect from the charging cord connector 104, based on an indication that the device 108 is fully charged. In some embodiments, the power supply 106 may be configured to disconnect from the charging cord connector 104, based on an indication that power capacity of the power supply 106 is below a predetermined threshold. In some embodiments, the power supply 106 may be configured to move to an external power supply to charge itself if the power capacity of the power supply 106 is below a predetermined threshold.

The charging cord management device 102, the charging cord connector 104 and the power supply 106 may each include one or more electronic systems to perform one or more capabilities, as will be discussed further below with respect to FIG. 5.

As shown in FIG. 1, the device 108 may include a device needs to be charged, such as a battery system. In some embodiments, the device 108 can be installed inside or outside of a building structure. The device 108 may be connected to the charging cord management device 102 using the first charging cord 110. The first charging cord 110 may be affixed to and stored in the device 108 and may include feature of automatic retraction and dispensation. The first charging cord 110 and the second charging cord 112 can be configured to transfer electrical power and/or data. The first charging cord 110 and the second charging cord 112 may enter, exit and/or pass through from any position of the charging cord management device 102. In some embodiments, the first charging cord 110 and the second charging cord 112 can be in shape of round, square, rectangle, triangle, parallelogram, and/or oval, or any other shape. The first charging cord 110 and the second charging cord 112 may include a feature of gravitational deformation. In some embodiments, the second charging cord 112 can be fully or partially retracted into or dispensed from the charging cord management device 102 manually or automatically. The second charging cord 112 can be dispensed from the charging cord management device 102 until the length of the second charging cord 112 is sufficient to connect the charging cord connector 104 and the power supply 106.

In some embodiments, the charging process of the device 108 can be conducted automatically, for example at night, and/or at any pre-determined time. In some embodiments, the charging process of the device 108 can be conducted automatically, for example, when the charging cord management device 102, and/or the charging cord connector 104 are configured to detect that no user is in the proximity of the device 108, the charging cord management device 102, and/or the charging cord connector 104, such as no motion is detected.

In one example, the charging cord management device 102 may be configured to sense that the power capacity of the device 108 at a pre-determined time, for example, 10 pm at night. In some embodiments, if the power capacity of the device 108 is below a per-determined threshold, the charging cord management device 102 may be configured to locate if the power supply 106 is within a range. In some embodiments, if the power supply 106 is determined to be within a range of the charging cord management device 102, charging cord management device 102 may be configured to align and/or move the second charging cord 112 and/or the charging cord connector 104 to be in proximity of the power supply 106, as will be described in detailed with reference to FIGS. 2A-2C, FIGS. 3A-3B and FIGS. 4A-4C. The charging cord management device 102 may be configured to be in contact with the power supply 106 to transmit the power from the power supply 106 to the device 108. In this process, the charging cord management device 102 may manage to extend the second charging cord 112 to facilitate the contact with the power supply 106. The charging cord management device 102 may be configured to retract the second charging cord 112 and/or the charging cord connector 104 to disconnect from the power supply 106, for example, based on an indication from the electronic device 108 is fully charged.

In one example, the charging cord management device 102 may be configured to locate the power supply 106 is not within a range. In some embodiments, the charging cord management device 102 may be configured to manage the second charging cord 112 to move in proximity of the power supply 106, as will be described in detailed with reference to FIGS. 2A-2C, FIGS. 3A-3B and FIGS. 4A-4C. In some embodiments, the power supply 106 may be configured to move in proximity of the charging cord connector 104, upon an indication that the power supply 106 is not within a range of the charging cord management device 102.

Figure 2C:
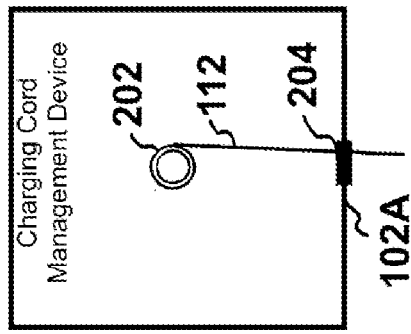
FIG. 2C is a schematic diagram of an exemplary charging cord management device according to an embodiment of the present disclosure.
Figure 2B:
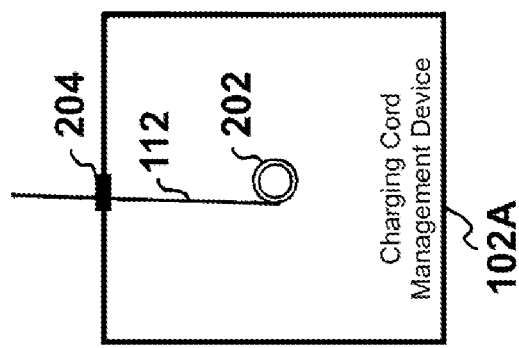
FIG. 2B is a schematic diagram of an exemplary charging cord management device according to an embodiment of the present disclosure.
Figure 2A:
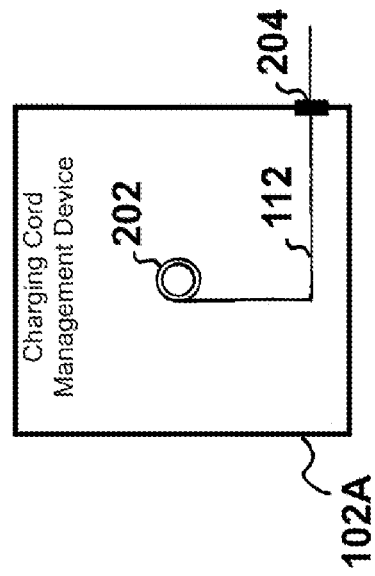
FIG. 2A is a schematic diagram of an exemplary charging cord management device according to an embodiment of the present disclosure.

FIG. 2A is a schematic diagram of an exemplary charging cord management device according to an embodiment of the present disclosure.

As illustrated in FIG. 2A, an exemplary charging cord management device 102A comprises a charging cord driving device 202, a port 204 and the second charging cord 112.

The charging cord management device 102A may include the charging cord management device 102 in FIG. 1. The charging cord driving device 202 may be located in the center of the charging cord management device 102A. In some embodiments, the charging cord driving device 202 may include a cord reel, which may be configured to retract or dispense the second charging cord 112 by an external non-powered driving force or a powered device, such as a motor, or both. By retracting or releasing the second charging cord 112, the charging cord connector 104 and the power supply 106 may be connected to provide power through the second charging cord 112 and the charging cord management device 102A or disconnected. In some embodiments, the charging cord driving device 202 may include one or more electronic systems to provide features including timing control, driving torque control, position limiting, remote control, external wireless or wired communication, current control, voltage control, manual operation, switched power operation, battery charge level monitoring, human body sensing, light sensing, infrared sensing.

The port 204 may allow the second charging cord 112 to pass through, thus the second charging cord 112 can be retracted into or dispensed from the charging cord management device 112A. According to some embodiments, the port 204 can be located on the side, at the bottom or at the top of the charging cord management device 102A.

As described above with reference to FIG. 1, the charging cord management device 102 may be configured to locate the power supply 106 is not within a range or within a range. In some embodiments, the charging cord management device 102A may be configured to dispense the second charging cord 112 through the port 204 to move in proximity of the power supply 106, by using the charging cord driving device 202. In some embodiments, the charging cord management device 102 may be configured to retract the second charging cord 112 through the port 204 to move away from the power supply 106, by using the charging cord driving device 202.

FIG. 2B is a schematic diagram of an exemplary charging cord management device according to an embodiment of the present disclosure.

As illustrated in FIG. 2B, the charging cord management device 102A comprises the charging cord driving device 202, the port 204 and the second charging cord 112. As shown in FIG. 2B, the port 204 may be located at the top of the charging cord management device 102A. The second charging cord 112 may be retracted or dispensed at the top of the charging cord management device 102A.

FIG. 2C is a schematic diagram of an exemplary charging cord management device according to an embodiment of the present disclosure.

As illustrated in FIG. 2C, the charging cord management device 102A comprises the charging cord driving device 202, the port 204 and the second charging cord 112. As shown in FIG. 2C, the port 204 may be located at the bottom of the charging cord management device 102A. The second charging cord 112 may be retracted or dispensed at the bottom of the charging cord management device 102A.

The position of the port 204 may not be limited to the illustration as shown in FIGS. 2A-2C. The port 204 may be located at any part of the charging cord management device 102A. In some embodiments, one or more extra structures may be used to support and guide the second charging cord 112.

Figure 3B:
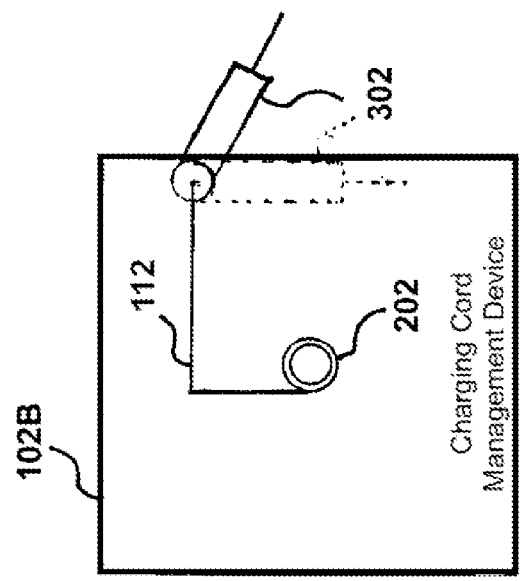
FIG. 3B is a schematic diagram of an exemplary charging cord management device according to another embodiment of the present disclosure.
Figure 3A:
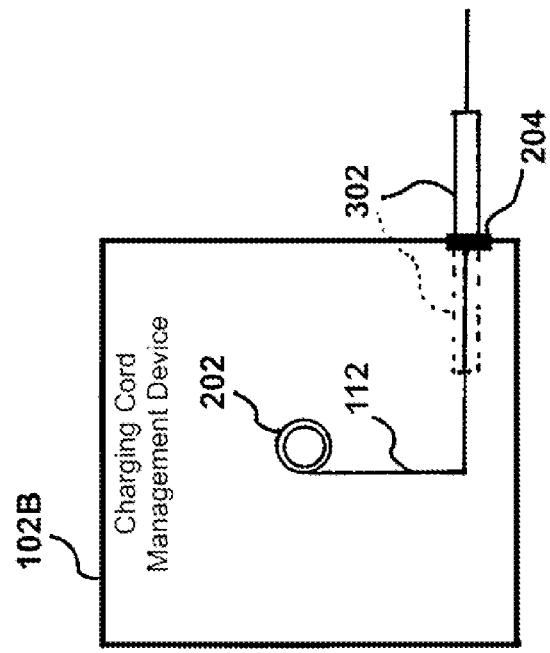
FIG. 3A is a schematic diagram of an exemplary charging cord management device according to another embodiment of the present disclosure.

FIG. 3A is a schematic diagram of an exemplary charging cord management device according to another embodiment of the present disclosure.

As illustrated in FIG. 3A, an exemplary charging cord management device 102B comprises a charging cord support member 302, the charging cord driving device 202, the port 204 and the second charging cord 112.

The charging cord support member 302 may be used to guide and support the second charging cord 112 during charging process. The charging cord 112 may be inserted through the charging cord support member 302, which may be connected with the port 204, thus the charging cord support member 302 can be retracted or extended through the port 204. The charging cord support member 302 can be fixed or protruding extended by a spring loading or other driving force, such as a motor. The charging cord support member 302 can be selectively adjusted or positioned manually or by operation of the motor to enhance the proximity of the charging cord connector 104 and the power supply 106. The motor may include wireless control module, thus the charging cord support member 302 may be adjusted or positioned wirelessly. The charging cord support member 302 may be selectively adjusted from the position shown in solid lines, as located outside the charging cord management device 102B to the position in phantom lines as located inside the charging cord management device 102B in FIG. 3A.

FIG. 3B is a schematic diagram of an exemplary charging cord management device according to another embodiment of the present disclosure.

As illustrated in FIG. 3B, the charging cord management device 102B comprises the charging cord support member 302, the charging cord driving device 202, and the second charging cord 112.

The charging cord support member 302 can be installed at a fixed angle or angular swing by spring loading or other driving force. One end of the charging cord support beam 302 may be affixed to the charging cord management device, the other end of the charging cord support beam 302 can be free and adjustable to guide the second charging cord 112 away from the charging cord management device 102B. The charging cord support beam 302 may be fully retracted inside the charging cord management device 102B. The charging cord support member 302 may be operated manually or by a motor. The charging cord support member 302 may also include a wireless control module to operate the motor, thus the charging cord support member 302 may be adjusted wirelessly. The charging cord support member 302 can be selectively pivoted from the straight, vertical position shown in phantom lines to the angled position shown in solid lines in FIG. 3B.

In some embodiments, the power supply 106 may be located at a distance from the charging cord management device 102, additional devices may be used to route the second charging cord 112, so the charging cord connector 104 can connect to the power supply 106.

Figure 4A:
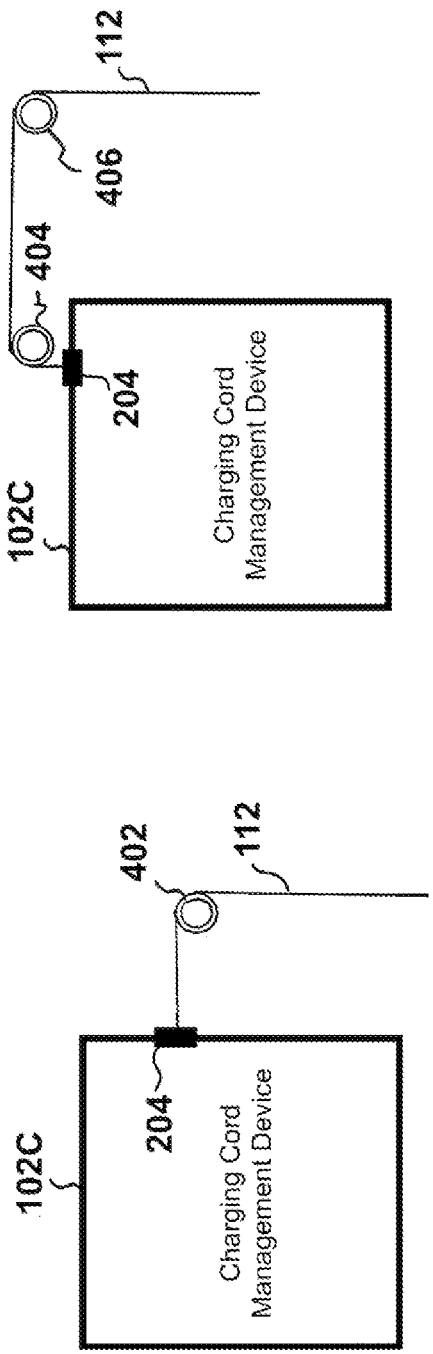
FIG. 4A is a schematic diagram of an exemplary charging cord management device according to yet another embodiment of the present disclosure.

FIG. 4A is a schematic diagram of an exemplary charging cord management device according to yet another embodiment of the present disclosure.

As illustrated in FIG. 4A, an exemplary charging cord management device 102C comprises a charging cord driving device 402, the second charging cord 112 and the port 204. The charging cord management device 102C may include a reel to store the second charging cord 112, a motor to operate the reel, and a wireless control module to operate the motor.

As shown in FIG. 4A, the charging cord driving device 402 may be a guiding wheel or a ring. The port 204 may be located on the side of the charging cord management device 102C. The second charging cord 112 can be guided using the charging cord driving device 402 to connect the charging cord connector 104 and the power supply 106.

Figure 4B:
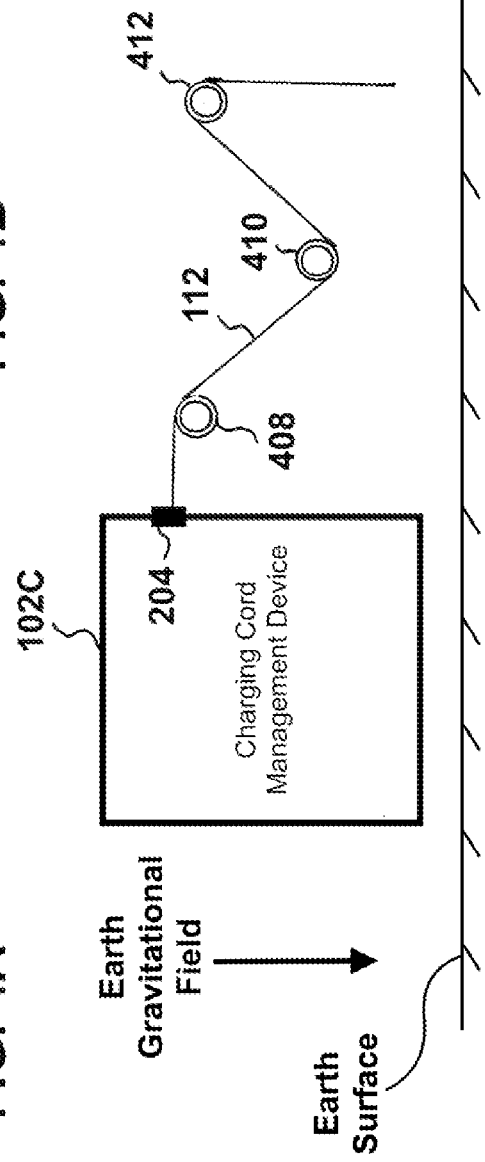
FIG. 4B is a schematic diagram of an exemplary charging cord management device according to yet another embodiment of the present disclosure.

FIG. 4B is a schematic diagram of an exemplary charging cord management device according to yet another embodiment of the present disclosure.

As illustrated in FIG. 4B, an exemplary charging cord management device 102C comprises charging cord driving devices 404, 406, the second charging cord 112 and the port 204. The charging cord management device 102C may include a reel to store the second charging cord 112, a motor to operate the reel, and a wireless control module to operate the motor.

As shown in FIG. 4B, the charging cord driving device 404 and/or 406 may include a guiding wheel or a ring. The port 204 may be located at the top of the charging cord management device 102C. The second charging cord 112 can be guided using the charging cord driving device 404 and 406 to connect the charging cord connector 104 and the power supply 106.

Figure 4C:
FIG. 4C is a schematic diagram of an exemplary charging cord management device according to yet another embodiment of the present disclosure.

FIG. 4C is a schematic diagram of an exemplary charging cord management device according to yet another embodiment of the present disclosure.

As illustrated in FIG. 4C, an exemplary charging cord management device 102C comprises charging cord driving devices 408, 410, 412, the second charging cord 112 and the port 204. The charging cord management device 102C may include a reel to store the second charging cord 112, a motor to operate the reel, and a wireless control module to operate the motor. The charging cord driving device 408, 410 and 412 may include a guiding wheel or a ring. The port 204 may be located on the side of the charging cord management device 102C. The second charging cord 112 can be guided using the charging cord driving device 408, 410, and 412 to form any desired route to connect the charging cord connector 104 and the power supply 106.

Figure 5:
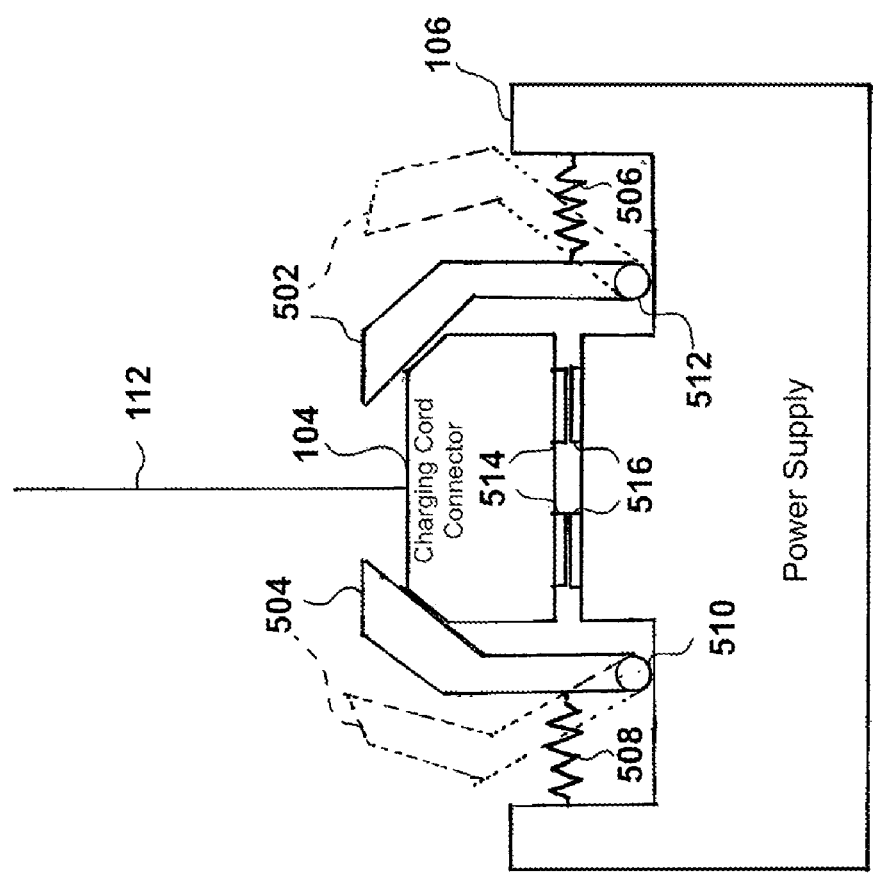
FIG. 5 is a schematic diagram of an exemplary charging cord connector and an exemplary power supply according to an embodiment of the present disclosure.

FIG. 5 is a schematic diagram of an exemplary charging cord connector and an exemplary power supply according to an embodiment of the present disclosure.

As illustrated in FIG. 5, an exemplary charging cord connector and an exemplary power supply comprise the charging cord connector 104, the power supply 106, the second charging cord 112, a first bracket 502 and a second bracket 504, a first spring 506 and a second spring 508, a first hinge 510 and a second hinge 512, a first electrode 514 and a second electrode 516.

As shown in FIG. 5, the first bracket 502 and/or the second bracket 504 may include a bracket to fit the shape of the charging cord connector 104. The charging cord connector 104 may be securely fixed in one or more positions by the first bracket 502 and/or the second bracket 504 during a charging process. For example, the first bracket 502 and/or the second bracket 504 may include a clamp. The first hinge 510 and the second hinge 512 may be used to affix the first bracket 502 and/or the second bracket 504 to the power supply 106, thus the position of the first bracket 502 and/or the second bracket 504 may be selectively adjusted. In some embodiments, the first bracket 502 may be configured to be in contact with the charging cord connector 104 and controlled by the first spring 506. In some embodiments, the second bracket 504 may be configured to be in contact with the charging cord connector 104 and controlled by the second spring 508. In some embodiments, the first bracket 502 and/or the second bracket 504 may be controlled by one or more external driving forces to be in contact with the charging cord connector 104, such as for example, one or more electromagnetic forces and motors, for example, when the charging cord connector 104 is in proximity with the power supply 106. The first electrode 514 and the second electrode 516 may be used to transfer electrical power from the power supply 106 to the charging cord connector 104. In some embodiments, the first electrode 514 may be tightly connected and in contract with the second electrode 516 when the charging cord connector 104 is configured to be securely locked in a position by the first bracket 502 and the second bracket 504.

As shown in FIG. 5, the first bracket 502 and the second bracket 504 may be selectively adjusted to the position shown in solid lines, as to configure the charging cord connector 104 to be in contact with the power supply 106 during a charging process. The first bracket 502 and/or the second bracket 504 may be selectively adjusted to the position shown in phantom lines, as to disconnect the charging cord connector 104 from the power supply 106 after the charging process is completed.

Figure 6:
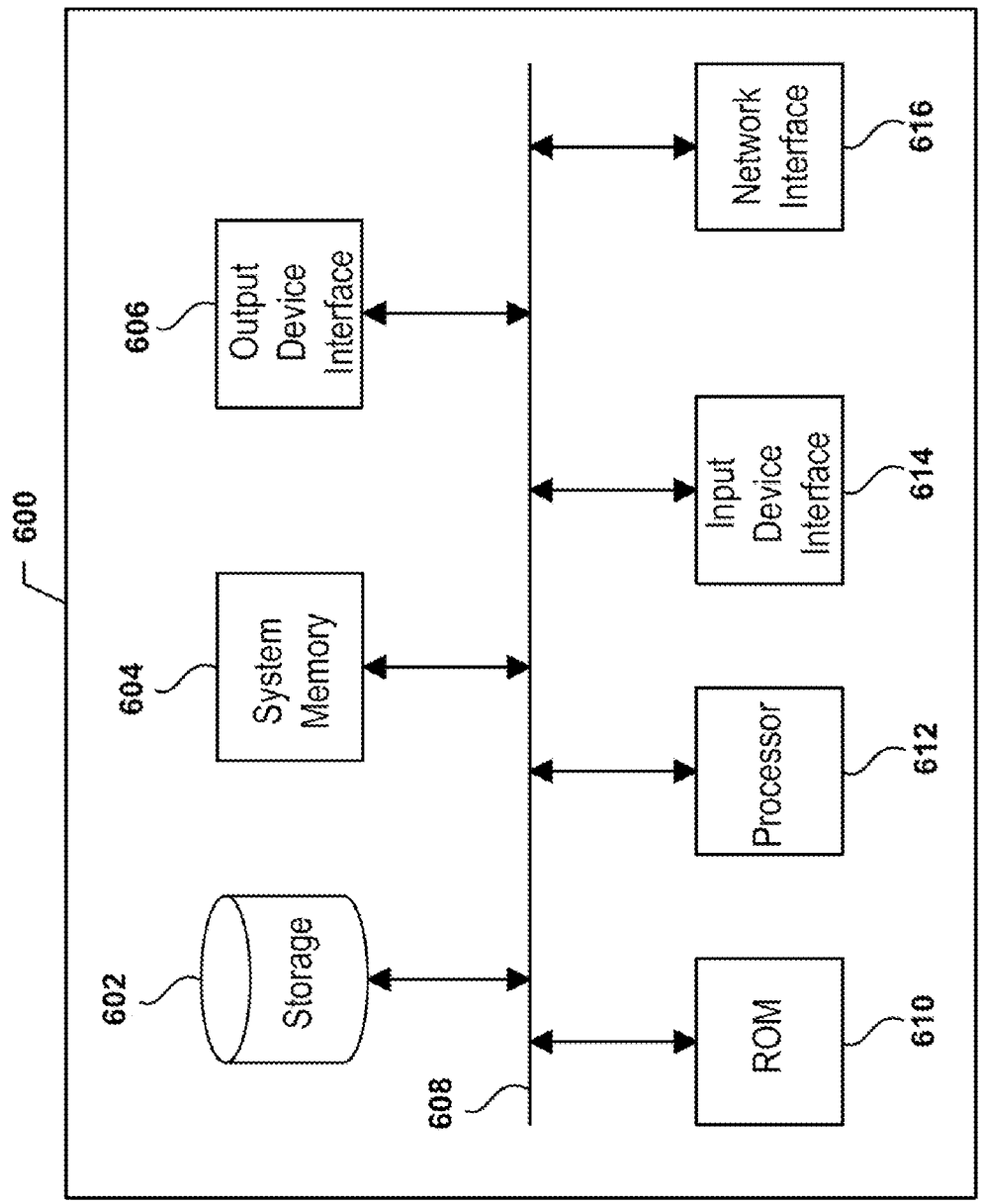
FIG. 6 conceptually illustrates an example processor system with which one or more implementations of the subject technology can be implemented.

FIG. 6 conceptually illustrates an example processor system with which one or more implementations of the subject technology can be implemented.

As shown in FIG. 6, an example electronic system 600 with which one or more implementations of the subject technology can be implemented. The charging cord management device 102, the charging cord connector 104 and the power supply 106 may each include one or more electronic system 600, for example, may be, or may include, one or more wearable devices, a computing device, a tablet device, and/or generally any electronic device. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, one or more network interface(s) 616, and/or subsets and variations thereof.

The bus 608 collectively represents all system, peripheral, and chipset buses that communicatively connect the numerous internal devices of the electronic system 600. In one or more embodiments, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are utilized by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive or solid-state data storage chip) may be used as the permanent storage device 602.

In one or more implementations, a removable storage device may be used as the permanent storage device 602. Like the permanent storage device 602, the system memory 604 may be a read-and-write memory device. However, unlike the permanent storage device 602, the system memory 604 may be a volatile read-and-write memory, such as random-access memory (RAM). The system memory 604 may store one or more of the instructions and/or data that the one or more processing unit(s) 612 may utilize at runtime. In one or more implementations, the processes of the subject disclosure are stored in the system memory 604, the permanent storage device 602, and/or the ROM 610. From these various memory units, the one or more processing unit(s) 612 retrieve instructions to execute and data to process in order to execute the processes of one or more implementations.

The bus 608 also connects to the input and output device interfaces 614 and 606. The input device interface 614 enables a user to communicate information and select commands to the electronic system 600, or enables the electronic system 600 to collect data and information from a sensor. Input devices that may be used with the input device interface 614 may include, for example, motion sensor, torque sensor, light sensor, voltage sensor and current sensor. The output device interface 606 may enable, for example, the display of images generated by the electronic system 600, or enables the electronic system 600 to drive output devices. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information, or an electrical motor, a power driven reel, an electromagnetic device, or any other device for maneuvering. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 6, bus 608 also couples electronic system 600 to one or more networks (not shown) through one or more network interface(s) 616. The one or more network interface(s) may include Bluetooth interface, a BLE interface, a Zigbee interface, an Ethernet interface, a Wi-Fi interface, a multimedia over coax alliance (MoCA) interface, a reduced gigabit media independent interface (RG-MII), or generally any interface for connecting to a network. In this manner, electronic system 600 can be a part of one or more networks of computers (such as a local area network (LAN), a wide area network (WAN), or an Intranet, or a network of networks, such as the Internet. Any or all components of electronic system 500 can be used in conjunction with the subject disclosure.

With the implementation of the electronic system 600, the charging cord management device 102, the charging cord connector 104 and the power supply 106 may perform charging management to supply power the device 108 according to pre-programed instructions, or follow real-time commands.

What is claimed is:

1. A system for managing automated charging, the automated charging management system comprising:
    a charging cord management device;
    a charging cord connector;
    a first charging cord; and
    a second charging cord,
    wherein the first charging cord and the second charging cord are connected with the charging cord management device, and the first charging cord is different from the second charging cord;
    wherein the charging cord connector is connected with the second charging cord;
    wherein the charging cord management device is configured to search for a power supply within range of the charging cord management device without user interaction;
    wherein the charging cord management device is configured to locate the power supply without user interaction, when it is determined that the power supply is within range of the charging cord management device;
    wherein the charging cord management device is configured to control the second charging cord and the charging cord connector in the direction of the earth gravitational field from a first altitude to a second altitude without user interaction and wherein the first altitude is different from the second altitude;
    wherein the charging cord management device is configured to align the charging cord connector with the power supply in the direction of the earth gravitational field from a third altitude to a fourth altitude without user interaction and wherein the third altitude is different from the fourth altitude; and
    wherein the charging cord connector is configured to be in contact with the power supply without user interaction.

2. The automated charging management system of claim 1, wherein the charging cord management device further comprises a charging cord driving device.

3. The automated charging management system of claim 1, wherein the charging cord management device further comprises a port.

4. The charging cord management device of claim 3, wherein the port is further configured to be located at any position of the charging cord management device.

5. The automated charging management system of claim 1, wherein the charging cord management device further comprises a charging cord support member.

6. The automated charging management system of claim 1, wherein the charging cord management device is installed as a surface mount, or fully or partially hidden inside a building structure.

7. The charging cord management device of claim 6, wherein the charging cord management device further comprises a guiding wheel or a ring.

8. The automated charging management system of claim 1, wherein the charging cord connector further comprises a motion sensor and a position sensor.

9. The automated charging management system of claim 1, wherein the charging cord connector further comprises a wireless communication interface.

10. The automated charging management system of claim 1, wherein the first charging cord is affixed and stored in a device to be charged, and wherein the first charging cord further comprises features of automatic retraction and dispensation.

11. The automated charging management system of claim 10, the charging cord management device is configured to sense a power capacity of the device at a pre-determined time before the charging cord management device is configured to search for a power supply within range of the charging cord management device without user interaction.

12. The automated charging management system of claim 10, the charging cord management device is configured to detect that no motion is in proximity of the charging cord management device or the device, before the charging cord management device isconfigured to search for a power supply within range of the charging cord management device without user interaction.

13. The charging cord management device of claim 10, wherein the charging cord management device further comprises a motor, and wherein the motor is wirelessly operated to selectively extend or retract the second charging cord, based on an indication of an electric power capacity of the device, or an indication of proximity of the powersupply, or an indication of the electric power capacity of the power supply.

14. The automated charging management system of claim 1, wherein the second charging cord is stored inside the charging cord management device.

15. The automated charging management system of claim 1, wherein the first and the second charging cord are configured to include feature of gravitational deformation.

16. The automated charging management system of claim 1, wherein the power supply further comprises a power storage.

17. The automated charging management system of claim 1, wherein the power supply is further configured to include feature of motion capability, positioning and data communication.

18. The automated charging management system of claim 1, wherein each of the charging cord management device, the charging cord connector, the power supply further comprises a bus, a processing unit, a system memory, a read-only memory, a permanent storage device, an input device interface, an output device interface, and a network interface.

19. The automated charging management system of claim 1, wherein the power supply further comprises a charging cord connector bracket to secure the connection between the charging cord connector and the power supply.

20. The power supply of claim 19, wherein the charging cord connector bracket is further configured to be operated by a spring, electromagnetic force or a motor.

* * * * *